(12) United States Patent
Timmis et al.

(10) Patent No.: US 7,815,103 B2
(45) Date of Patent: Oct. 19, 2010

(54) METHOD OF AND SYSTEM FOR PREDICTION OF THE STATE OF HEALTH OF AN APPARATUS

(75) Inventors: Jon Timmis, York (GB); Rogerio de Lemos, Canterbury (GB); Modupe Ayara, Chafford Hundred (GB); Simon J. Forrest, Dundee (GB)

(73) Assignee: NCR Corporation, Duluth, GA (US)

(*) Notice: Subject to any disclaimer, the term of this patent is extended or adjusted under 35 U.S.C. 154(b) by 740 days.

(21) Appl. No.: 11/288,778

(22) Filed: Nov. 29, 2005

(65) Prior Publication Data

US 2006/0131381 A1 Jun. 22, 2006

(30) Foreign Application Priority Data

Dec. 17, 2004 (GB) ................. 0427695.2

(51) Int. Cl.
*G06Q 40/00* (2006.01)
*G07D 11/00* (2006.01)
*G07F 19/00* (2006.01)
*G06F 7/00* (2006.01)

(52) U.S. Cl. ..................... 235/376; 235/379
(58) Field of Classification Search ........... 235/379, 235/376, 487, 385; 702/183, 182, 84
See application file for complete search history.

(56) References Cited

U.S. PATENT DOCUMENTS 4,849,894 A 7/1989 Probst
4,931,963 A * 6/1990 Kimura et al. .............. 235/376
5,563,393 A * 10/1996 Coutts ........................ 235/379
5,960,381 A * 9/1999 Singers et al. .............. 702/183
6,766,232 B1 7/2004 Klausner
7,232,063 B2 * 6/2007 Fandel et al. ................ 235/376
2002/0091972 A1* 7/2002 Harris et al. ................... 714/47

FOREIGN PATENT DOCUMENTS

| EP | 0 326 188 | 8/1989 |
| EP | 1153368 A1 | 11/2001 |
| GB | 2 378 248 A | 2/2003 |
| WO | WO 01/43079 A1 | 6/2001 |
| WO | WO 0218879 A1 * | 3/2002 |
| WO | WO 02/054223 A1 | 7/2002 |

* cited by examiner

*Primary Examiner*—Thien M. Le
*Assistant Examiner*—Thien T Mai
(74) *Attorney, Agent, or Firm*—Gregory A. Welte

(57) ABSTRACT

A method is describe of predicting the probable future condition of one or more components within an apparatus comprising a plurality of sensors arranged to monitor the operation of components of the apparatus and a control means arranged to receive said information from said plurality of sensors. The method comprises receiving said sensor information; analyzing the information to ascertain sensor patterns from said sensor information; comparing said sensor patterns with detectors, which are predefined patterns, indicative of the future condition of said one or more components within the apparatus; and classifying said sensor patterns as being indicative of future failure of a component or not based upon a comparison of sensor patterns with said detectors.

2 Claims, 6 Drawing Sheets

METHOD OF AND SYSTEM FOR PREDICTION OF THE STATE OF HEALTH OF AN APPARATUS

The invention relates to a method of and system for prediction of the state of health of an apparatus, and has particular application, for example, to use in self service terminals (SST) such as automated teller machines (ATM).

BACKGROUND

As the invention has particular application to an ATM for the sake of clarity the invention will be described with reference to an ATM and to a network of ATMs. However, the invention can be applied to the operation of any apparatus or device as well as any network of such apparatuses or devices.

A standard ATM having the facility to dispense bank notes includes electronic control means connected to both a currency dispenser unit and a user interface device. As is well known, in operation of such an ATM a user inserts a user identity card into the machine and then enters certain data, such as a personal identification number (PIN) and the quantity of currency required to be dispensed, by means of a key pad incorporated in the user interface device. The ATM will then process the requested transaction, dispense notes extracted from one or more storage cassettes within the currency dispenser unit, update the user's account to reflect the transaction and return the card to the user as part of a routine operation.

In operation of an ATM, various malfunctions may occur from time to time. For example, bank notes may become jammed in the feed path, the pick means, utilized to select a note from an ATM currency cassette, may fail to pick a bank note from the associated storage cassette, or there may occur multiple feeding in which two or more notes are fed in superposed relationship to the stacking means.

The problems discussed above may be caused by wear of components in the dispenser unit or by changes in the ambient conditions in the vicinity of the ATM.

When ATM malfunctions, such as those discussed above, occur the ATM may be shut down until the malfunction is rectified, which will require the intervention of a trained operator, or in the event of multiple feeding the picked notes will be diverted to a purge bin resulting in less efficient operation of the ATM.

These problems have to-date been addressed by a sensor system arranged to monitor the condition of ATM components, at any given time, in which raw device status information is sent to a management system. There is, however, no information about previous state changes, and therefore any decisions made on the data are on a snapshot of the current state of the ATM, not on what has happened in light of previous behavior. Consequently, there is little chance for ATM network operators to plan preventative maintenance as they are only informed of problems once those problems have arisen.

SUMMARY

It is an object of the present invention to ameliorate the problems discussed above.

According to a first aspect of the present invention there is provided a method of predicting the probable future condition of one or more components within an apparatus comprising a plurality of sensors arranged to monitor the operation of components of the apparatus and a control means arranged to receive said information from said plurality of sensors, the method comprising: a) receiving said sensor information; b) analyzing said information to ascertain sensor patterns from said sensor information; c) comparing said sensor patterns with detectors, which are predefined patterns, indicative of the future condition of said one or more components within the apparatus; and d) classifying said sensor patterns as being indicative of future failure of a component or not based upon a comparison of sensor patterns with said detectors.

According to a second aspect of the present invention there is provided a system for predicting the probable future condition of one or more components within an apparatus, the system comprising a plurality of sensors arranged to monitor the operation of components of the apparatus and a control means arranged to: a) receive said information from said plurality of sensors; b) analyze said information to ascertain sensor patterns from said sensor information; c) compare said sensor patterns with detectors, which are predefined patterns, indicative of the future condition of said one or more components within the apparatus; and d) classify said sensor patterns as being indicative of future failure of a component or not based upon a comparison of sensor patterns with said detectors.

According to a third aspect of the present invention there is provided a computer program for predicting the probable future status of one or more components within an apparatus comprising a plurality of sensors arranged to monitor the operation of components of the apparatus and a control means arranged to receive said information from said plurality of sensors, the program being adapted to: a) receive said sensor information; b) analyze said information to ascertain sensor patterns from said sensor information; c) compare said sensor patterns with detectors, which are predefined patterns, indicative of the future condition of said one or more components within the apparatus; and d) classify said sensor patterns as being indicative of future failure of a component or not based upon a comparison of sensor patterns with said detectors.

The system is compatible with the existing management and error reporting systems currently used within SSTs and SST networks. It uses existing sources of data from the available sensing systems. The system can be expanded if new sensors are added without having to re-write any of the core software. Initially a set of generic detectors are used to immunize an SST or family of SSTs. These are then augmented by learning during the operation of the SST to provide a specialist set of detectors for each SST.

The software can predict approaching fatal states of the SST (in which a component failure will result in the SST being taken out of service) and raise an alert allowing for timely maintenance to be carried out and thus for the potential problem be avoided.

The network-wide system can filter alerts from the local systems and thereby reduce the number of "false positives" and unnecessary engineer call-outs reducing the total operating cost of the SST network.

This solution provides a scalable solution for the management of an SST network that uses learning and prediction to provide intelligent management. This will reduce the cost of maintaining an SST network by reducing the number of service engineer call outs and allow preventative maintenance to be scheduled more efficiently. It will also lead to higher availability of the SSTs in the network and increased customer satisfaction.

BRIEF DESCRIPTION OF THE DRAWINGS

An embodiment of the present invention will now be described, by way of example, with reference to the accompanying drawings, in which.

DETAILED DESCRIPTION

Prior to discussing a system and method in accordance with the present invention in more detail the structure and operation of an ATM will be described, including an existing sensor system in order to understand operational problems within an ATM and the sensor outputs they produce.

Figure 1:
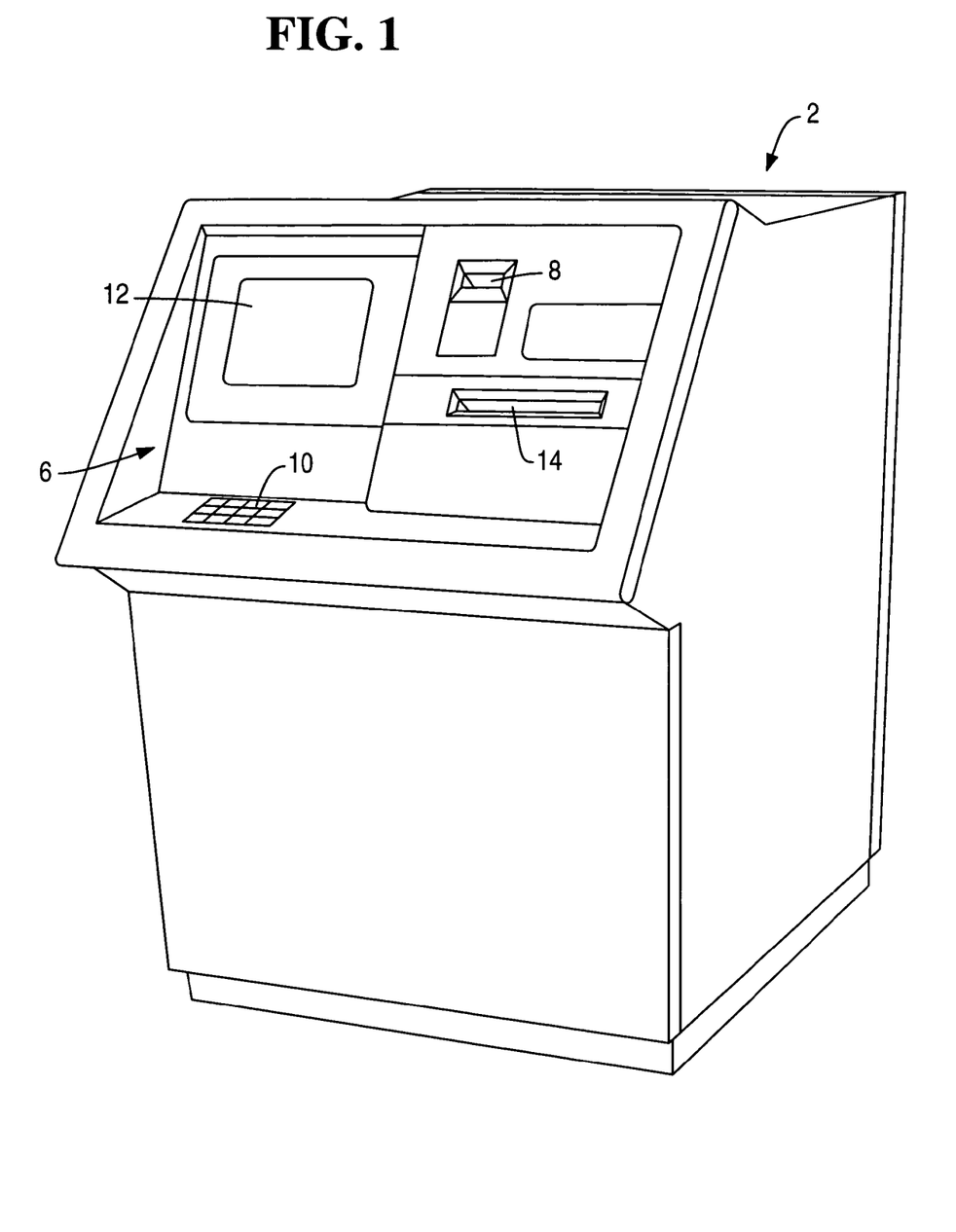
FIG. 1 is a perspective view of an ATM capable of utilizing a system and method in accordance with the present invention.
Figure 4:
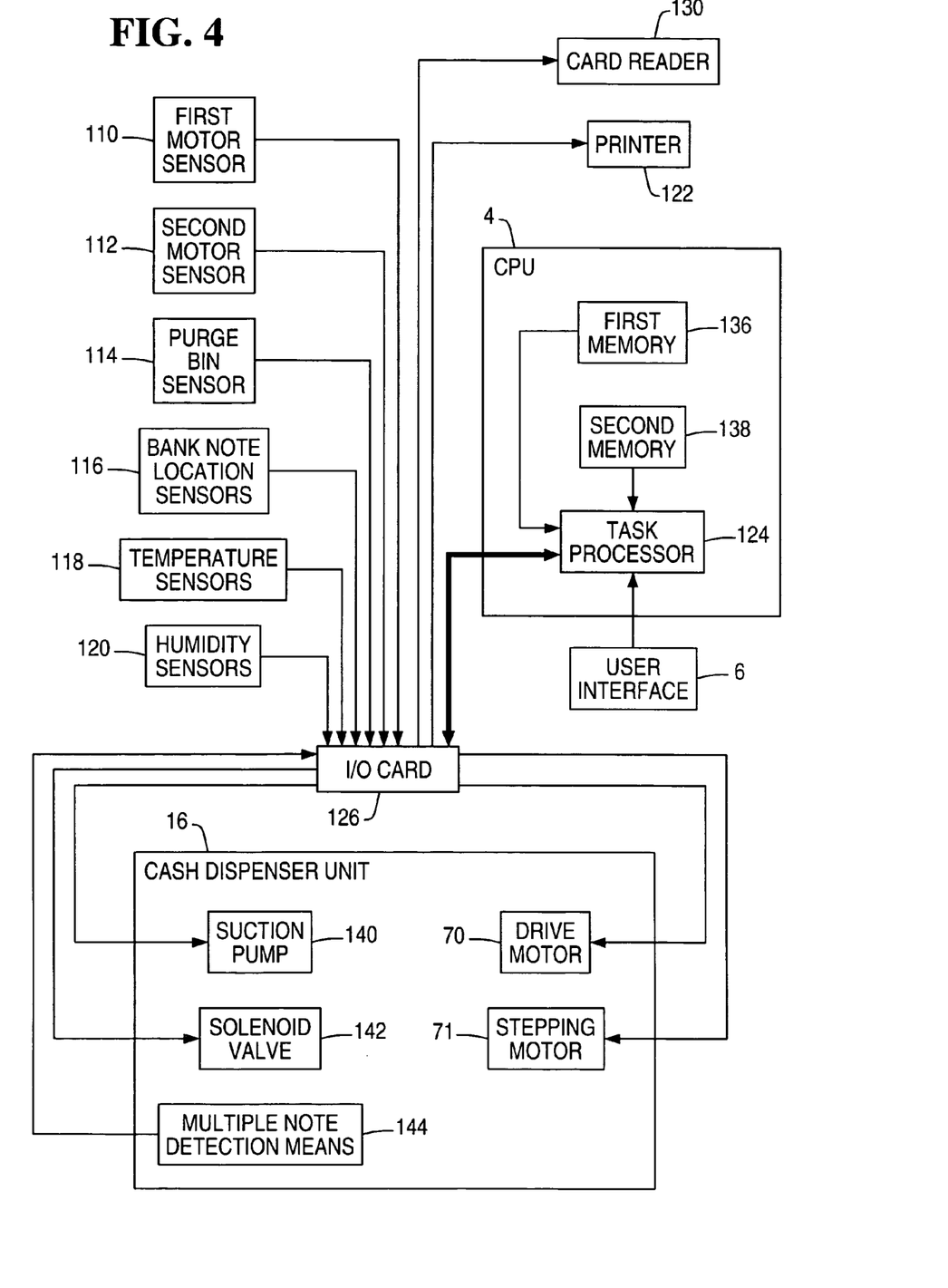
FIG. 4 is a block circuit diagram of the ATM of FIG. 1.

With reference to FIGS. 1 and 4 there is illustrated an ATM 2, which includes a control means in the form of a central processor unit (CPU) 4 which has stored therein a control program which controls the operation of the ATM 2 in dependence upon information gained from a plurality of sensors 110-120. If sensors are added or removed from the terminal 2 the program may be updated. The program monitors and optimizes the operation of the ATM 2.

The CPU 4 is connected to a user interface device 6 incorporating a slot 8 (FIG. 1), connected to a conventional card reader 130 (FIG. 4), for receiving a user identity card, a key pad 10 for inputting data, a screen 12 for displaying user information, and an output slot 14 for dispensing bank notes to a user. The CPU 4 is also connected to a cash dispenser unit 16 (FIG. 2) and a conventional printer 122 (FIG. 4) for printing documents such as statements, receipts and account balances.

Figure 2:
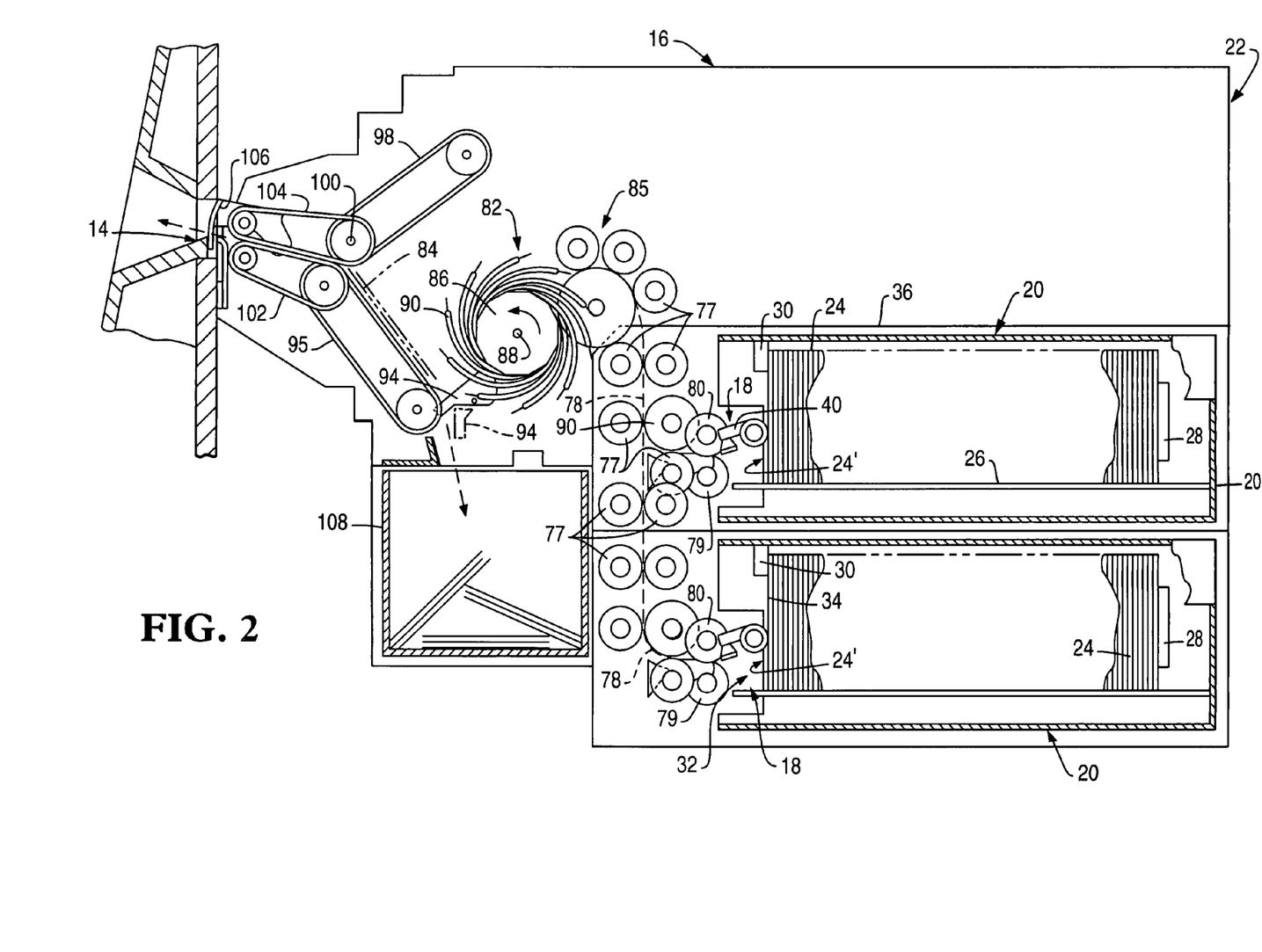
FIG. 2 is a side elevation of a cash dispenser unit of the ATM of FIG. 1, the dispenser unit having two pick means, and parts of said unit being omitted for the sake of simplicity.
Figure 3:
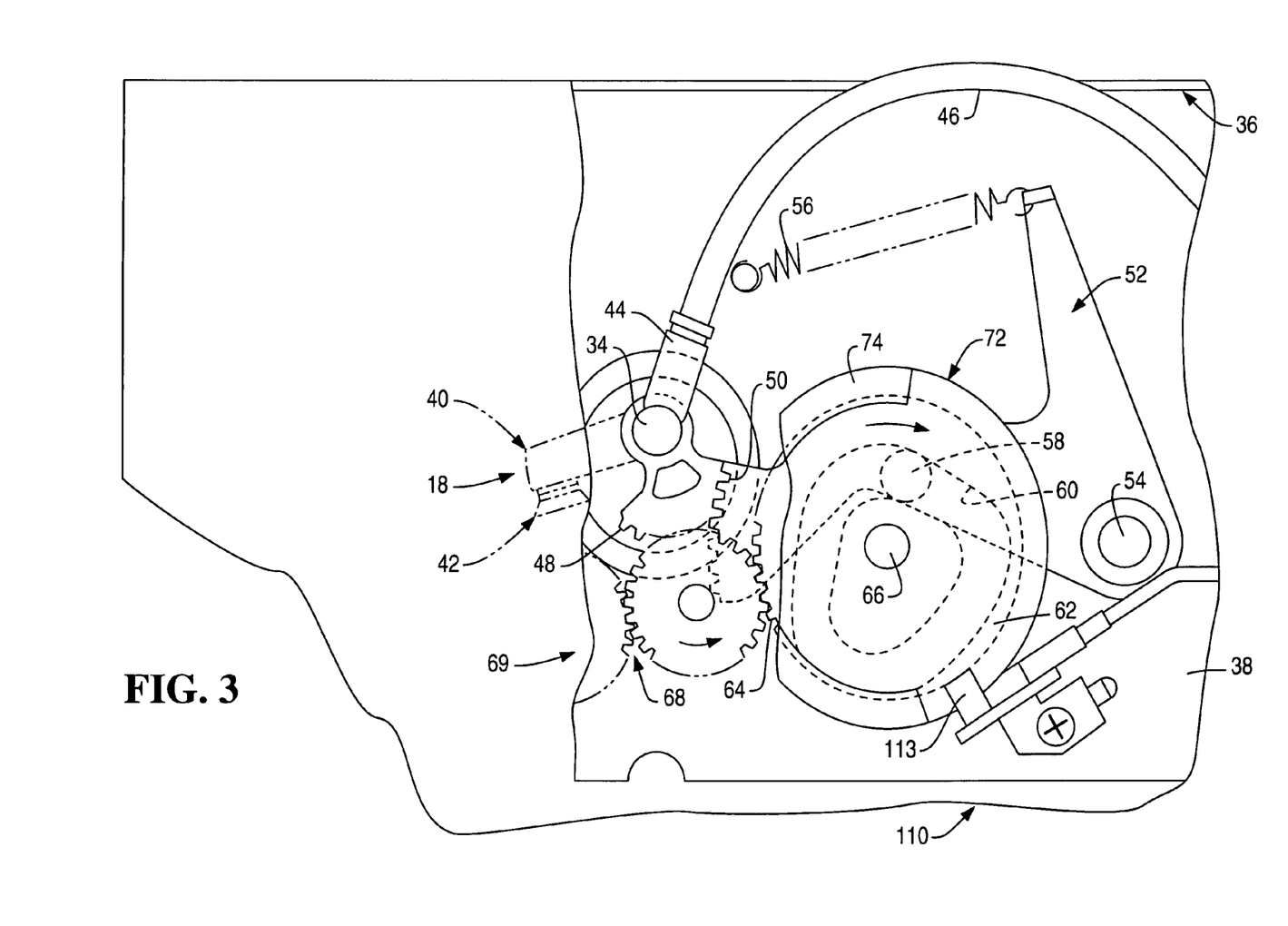
FIG. 3 is an enlarged side elevation of one of the pick means of FIG. 2.

Referring particularly to FIGS. 2 and 3, the cash dispenser unit 16 includes two similar pick means 18 arranged one above the other and respectively associated with two storage cassettes 20 which are removably mounted in a supporting framework 22 of the dispenser unit 16. Each of the storage cassettes 20 is arranged to contain a stack of bank notes 24, corresponding long edges of which are supported on a horizontal support plate 26 mounted in the storage cassette 20. The stack of notes 24 in each storage cassette 20 is urged by a spring loaded pusher member 28 towards a stop member 30 mounted at the front end of each storage cassette 20. An opening 32 is formed in the front end of each storage cassette 20, the opening 32 being closed normally by conventional shutter means (not shown) when the storage cassette 20 is not mounted in the dispenser unit 16. When a storage cassette 20 is mounted correctly in the dispenser unit 16, the shutter is automatically retracted to enable notes 24 to be extracted through the opening 32 by the associated pick means 18.

Each pick means 18 includes a tubular member 34 which extends between, and is rotatably mounted with respect to, side walls 36 and 38 (FIG. 3) of the framework 22. Two conventional pick arms 40, each incorporating a rubber suction pad 42, are secured on each tubular member 34, each pick arm 40 communicating with the interior of the associated tubular member 34. Corresponding ends of the tubular members 34 project beyond the side wall 38, and are each connected by a respective swivel elbow connector 44 to a respective rubber tube 46 via which reduced pressure is applied in operation to the respective tubular member 34. The suction force produced by the suction pump 140 (FIG. 4) is applied to a first note 24' in the stack of notes 24 in the storage cassette 20 via the tubular members 34 and suction pads 42, when the suction pads 42 are in contact with the first note 24' and a solenoid valve 142 (FIG. 4) located between the suction pump 140 and the suction pads 42 is opened.

A gear segment 48 is secured to that part of each tubular member 34 projecting beyond the side wall 38, the gear segment 48 being in co-operative engagement with a toothed end portion 50 of a first arm of a respective bell crank lever 52 which is pivotably mounted on a stud 54 secured to the outer surface of the wall 38. Each lever 52 is urged to rotate in a counter clockwise direction with reference to FIG. 3 by means of a spring 56 the ends of which are respectively attached to the side wall 38 and to the end of the second arm of the lever 52. A stud 58 is secured to one side of each lever 52, the stud 58 engaging in a cam track 60 formed in an associated cam member 62. Each cam member 62 is secured to a respective gear wheel 64 which is rotatably mounted on a respective shaft 66 projecting from the outer surface of the side wall 38. The gear wheels 64 are driven by gear wheels 68 forming part of a gear mechanism 69 operated by a main electric drive motor 70 (FIG. 4). In operation (with the drive motor 70 energized) the gear wheels 64 are rotated in a clockwise direction with reference to FIG. 3. This rotation of the gear wheels 64 brings about an oscillatory pivotal movement of the levers 52 by virtue of the engagement of the studs 58 in the cam tracks 60, the springs 56 holding the studs 58 in engagement with the inner edges of the cam tracks 60. By virtue of the engagement of the gear segments 44 with the toothed portions 50 of the levers 52, the oscillatory movement of the levers 52 brings about an oscillatory pivotal movement of the assemblies of the tubular members 34 and the associated pick arms 40. As will be explained in more detail later, the oscillatory movement of either of the assemblies of the tubular members 34 and the associated pick arms 40 is effective to cause notes 24 to be picked one by one from the stack of notes 24 held in the associated storage cassette 20.

The ATM 2 incorporates a motor sensor 110 which includes a timing disc 72 (FIG. 3) secured to the face of each gear wheel 60 remote from an associated cam member 62. The timing disc 72 is for the most part transparent but incorporates an arcuate opaque strip 74 extending around just over half the periphery of the disc 72. Each timing disc 72 is associated with optical sensing means, comprising an LED (not shown) and a co-operating photo-transistor sensor 112, which is arranged to sense the opaque strip 74. In operation, as each assembly of a gear wheel 64 and the associated cam member 62 and timing disc 72 rotates in response to energizing of the drive motor 70, the associated sensor 112 generates output signals in response to the sensing of the leading and trailing edges of the associated opaque strip 74. It should be understood that the signals generated by each of the sensors 112 provide indications as to the precise positions of the associated pick arms 40 at the times when these signals are generated.

As the drive motor 70 is a variable speed motor then the speed of rotation of the drive motor 70 can be varied in order to vary the time for which the pick arms 40 hold the associated suction pads 42 in contact with a first note 24' in the stack of notes 24 in one of the storage cassettes 20, before attempting to pick the first note 24' from the storage cassette 20. If the solenoid valve 142 is opened just after the suction pads 42 are brought into contact with the first note 24' then varying the period for which the suction pads 42 are held in contact with the first note 24' will vary the suction force applied to the first note 24', as will be discussed in more detail below.

The suction force applied to the first note 24' prior to attempting to pick the first note 24' from the storage cassette 20 can also be varied by varying the delay prior to opening the solenoid valve 142 to apply the suction force to the first note 24'. As the suction pump 140 (FIG. 4) operates continuously the longer the delay prior to opening the solenoid valve 142 the larger the suction force produced by the suction pump 140 will be.

Therefore, the suction force used in picking the first note 24' can be varied by varying either the speed of rotation of the drive motor 70 or varying the delay prior to opening the solenoid valve 142.

The dispenser unit 16 also incorporates feed rollers 77 for feeding the bank notes 24 along a feed path 78 from each of the storage cassettes 20 to a stacking wheel 82 and on to the output slot 14, the rollers 77 being associated with co-operating first and second rollers 79 and 80 which are positioned at the opening 32 in the front of each storage cassette 20.

In the course of a normal pick operation the lower long edge of the first bank note 24' of the stack of notes 24 in a selected one of the storage cassettes 20 is pulled partly out of the storage cassette 20 under the suction force applied by the respective suction pads 42, and is fed between the associated first and second rollers 79, 80. As the rollers 79, 80 engage the bank note 24' they urge the note 24' into the feed path 78 for feeding by the rollers 77.

The stacking wheel 82 is arranged to receive notes 24 fed along the feed path 78. The stacking wheel 82 serves to stack notes 24 picked from one or both of the storage cassettes 20 so as to form a bundle 84 of notes for delivery to the output slot 14 for collection by the user.

The stacking wheel 82 is driven by the drive motor 70 and is arranged to rotate continuously in operation in a counter clockwise direction. Means (not shown) are provided between the upper transport mechanism 85 and the stacking wheel 82 for detecting any multiple feeding of notes and for detecting any invalid or torn note. The stacking plates 86 are spaced apart in parallel relationship along the stacker wheel shaft 88, each stacking plate 86 incorporating a series of curved tines 90. The tines 90 of the stacking plates 86 pass between portions of a rockably mounted stripper plate assembly 94. In operation, each note fed along the feed path 78 to the stacking wheel 82 enters between adjacent tines 90 and is carried partly around the axis of the stacking wheel 82, the note being stripped from the wheel 82 by the portions of the stripper plate assembly 94 and being stacked against belt means 95. The belt means 95 co-operates with belt means 98 normally held in the position shown in FIG. 2. When the bundle of notes 84 (or possibly a single note only) to be dispensed to a user, in response to a cash withdrawal request, has been stacked against the belt means 95, the belt means 98 is rocked in a clockwise direction about a shaft 100 so as to trap the bundle 84 of notes between the belt means 95 and the belt means 98. It should be understood that in the course of this rocking movement separate belts making up the belt means 98 pass between adjacent pairs of the stacking plates 86.

Assuming that none of the notes 24 in the bundle 84 have been rejected for any reason, the belt means 95 and 98 are operated so as to drive the bundle 84 to an adjacent pair of belt means 102 and 104. The belt means 102 and 104 serve to drive the bundle 84 through the output slot 14 to a position where the bundle 84 can be collected by the user of the ATM 2, a shutter 106, which serves to close the slot 14 when the ATM is not in operation, having previously been retracted to an open position.

It should be understood that the belt means 95 and 98 are mounted in resilient relationship relative to each other, and the belt means 102 and 104 are also mounted in resilient relationship relative to each other, so that bundles of notes of varying thickness can be held between, and fed by, the belt means 95 and 98 and the belt means 102 and 104.

The belt means 95, 98, 102 and 104 are driven under the control of the CPU 4 by a bi-directional stepping motor 71.

If a multiple feeding has been detected in the course of stacking the bundle of notes 84 against the belt means 95, or if one or more of the notes in the bundle 84 have been rejected for any other reason, then the stripper plate assembly 94 is rocked into the position shown in chain outline in FIG. 2, and the belt means 95 and 98 are operated to feed the bundle 84 in a direction opposite to the normal feed direction, the bundle 84 being deposited in a purge bin 108 via an opening in the top thereof. Also, if a bundle 84 of notes or a single note 24 is misaligned or becomes jammed between the stacking wheel 82 and the output slot 14 then the stepping motor 71 can be operated so as to cause the belt means 95, 98, 102 and 104 to drive the note 24 or bundle 84 of notes in the forward and the reverse direction repeatedly, in an attempt to unblock the currency jam or to realign the bank note 24 or bundle 84 of bank notes.

An ATM 2 in accordance with the present invention incorporates a plurality of sensors 110-120 (FIG. 4) in communication with the CPU 4 arranged to monitor the operation of the ATM 2 and the ambient conditions. The CPU 4 is adapted to alter the operation of the ATM 2 in dependence on the output of the sensors 110-120 so as to reduce the number of malfunctions that occur in operation. The sensors 110-120 comprise: a first motor sensor 110 located adjacent the drive motor 70 and a second motor sensor 112 located adjacent the stepping motor 71, the first motor sensor 110 including a photo-transistor sensor 113 (FIG. 3) arranged to detect the speed of the drive motor 70, and the second motor sensor 112 including a photo-transistor sensor (not shown) arranged to detect the speed and rotational direction of the stepping motor 71; a purge bin sensor 114 located adjacent the entrance to the purge bin 108 and arranged to detect the deposition of a single note 24 or a bundle 84 of notes in the purge bin 108; a plurality of optical bank note location sensors 116 located along the feed path 78 and between the stacking wheel 82 and the output slot 14 and arranged to monitor at any instant the presence or absence of notes 24 at different locations within the ATM 2; a plurality of temperature sensors 118 located within the ATM 2, providing the CPU 4 with an accurate measure of the temperatures at selected locations throughout the ATM 2; and a plurality of humidity sensors 120 also located within the ATM 2 so as to provide the CPU 4 with an accurate measure of the ambient humidity at selected locations throughout the ATM 2.

When the ATM 2 is operating, the sensors 110-120 continually monitor the operation of the ATM 2 and ambient conditions and communicate the information obtained to the CPU 4. For example, the temperature sensors 118 may detect that the ambient temperature within the ATM 2 is lower than a predetermined temperature. On receipt of this information the CPU 4 will bring about one or more of a number of actions in order to reduce the likelihood of a malfunction occurring. Thus, for example the CPU 4 may reduce the speed of the drive motor 70 which drives the rollers 77, 79, 80 thereby reducing the likelihood of slippage between a note 24 and the rollers 77, 79, 80 while the note 24 is being fed through the dispenser unit 16. As the drive motor 70 also controls the positioning of the pick arms 40, reducing the speed of the drive motor 70 will cause the rubber suction pad 42 of the pick arms 40 to be held adjacent the first note 24' in the corresponding storage cassette 20 for an increased period of time thereby increasing the suction force applied to the note 24'. The exact increase in time that the rubber suction pads 42 are held in contact with the first note 24' prior to picking will depend on the ambient temperature detected by the temperature sensors 118. The time that suction is applied by the suction pads 42 to the first note 24' is accurately monitored by the CPU 4 through the photo-transistor sensor 112, which detect the speed of rotation of the motor 70 and consequently the location of the pick arms 40 and the associated suction pads 42.

Alternatively, the CPU 4 may increase the suction force applied to the first note 24' by increasing the delay prior to opening the solenoid valve 142 to apply the suction force to the first note 24', as discussed above.

The CPU 4 obtains temperature information from each of the temperature sensors 118 which can be processed separately so that the CPU 4 can vary the operation of individual components of the ATM 2 dependent on their temperatures so as to optimize the operation of the ATM 2. For example, a temperature sensor 118 is located in each of the storage cassettes 20 and at various locations throughout the feed path 78. If the first storage cassette 20 is at a higher temperature than the second storage cassette 20 a note 24 will be picked from the second storage cassette 20 more slowly than from the first storage cassette 20 in order to compensate for the lower temperature in the second storage cassette 20. Likewise, the feed means 77 can be controlled differently in different sections of the feed path 78 in order to compensate for differences in ambient temperature detected by the temperature sensors 118 located throughout the feed means 78.

The CPU 4 also monitors by means of the sensor 114 the deposition of a note 24 or a bundle 84 of notes in the purge bin 108. If the CPU 4 finds that the rejection rate is tending to increase then the CPU 4 will cause the speed of the drive motor 70 to be reduced, which action will normally be successful in reducing the rejection rate. Under the control of the control program stored therein, the CPU 4 maintains the time taken to dispense a bundle 84 of notes as low as possible while limiting the number of times that notes 24 are rejected to a predetermined acceptable percentage of total pick operations.

A feature of the ATM 2 when operated in accordance with prior art operational methods is that the operating characteristics and ambient conditions of the ATM 2 are monitored at given times and its operation is altered in dependence thereon in order to optimize its operation at that time. However, there is no method by which future errors can be predicted more accurately before they occur.

Figure 6:
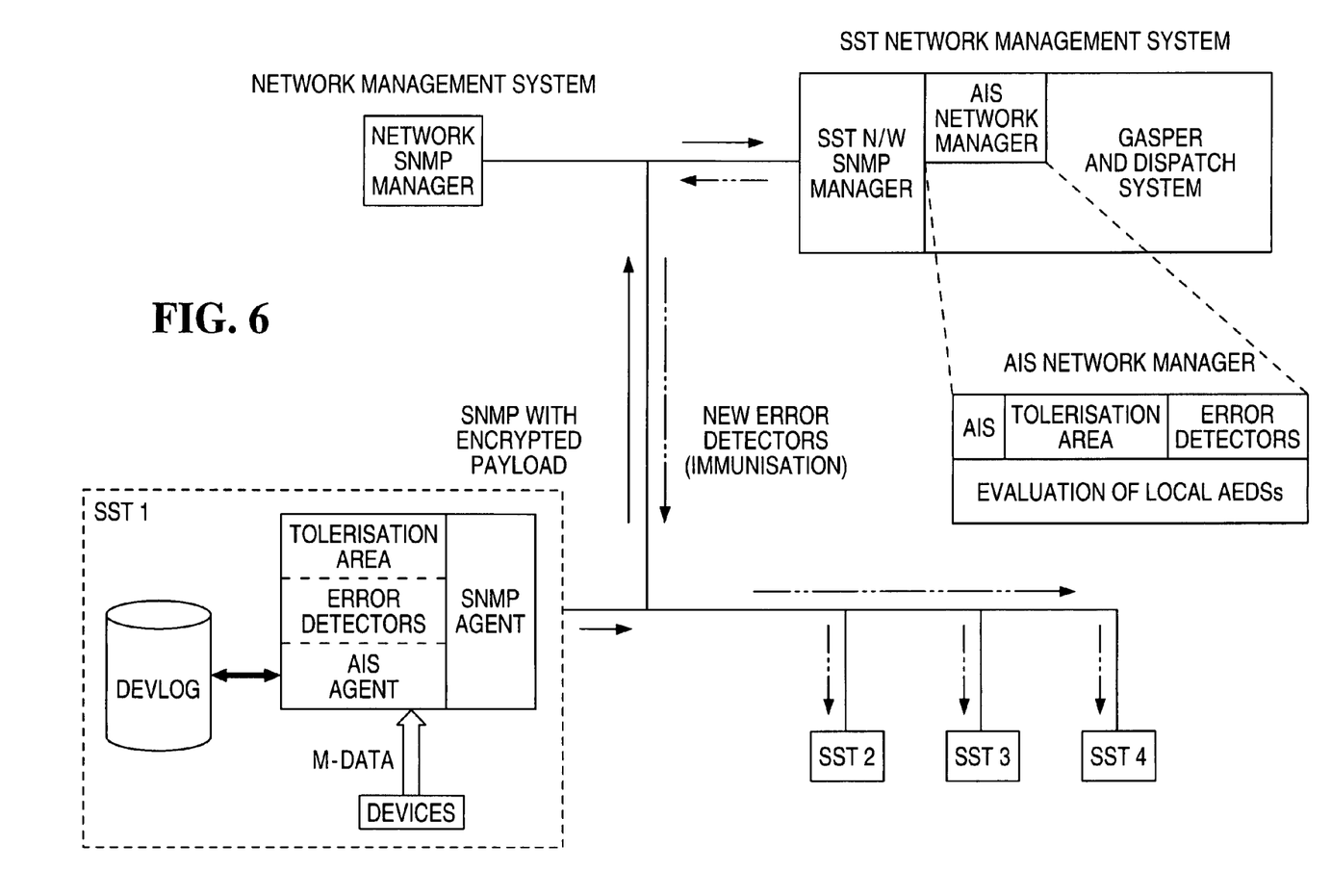
FIG. 6 is a block diagram of a network of ATMs, which are arranged to operate in accordance with the present invention.

When utilized, for example, in an ATM network the method, system and software in accordance with the present invention can be thought of as an architecture and implementation of an Artificial Immune System (AIS) to provide an Adaptable Error Prediction System (AEPS) that will add intelligence, learning and predictive capabilities to the processing of device status information provided by the modules in an ATM. The architecture is distributed throughout the network with agents on the individual ATMs in the network and a central management system that co-ordinates the processing of the information reported from the agents (FIG. 6). Each ATM has a local AEPS implemented as an AIS for local monitoring of the device data. These send their data through the ATM network to a network-wide AEPS which is implemented as a central AIS in the network management system. This allows the intelligent management of a distributed network of embedded systems through a framework structure that can be dynamically updated by incorporating nature-inspired learning into error detection. This is achieved by the two phases of design-time immunization and run-time adaptation. The framework also divides the learning mechanisms into the two levels of: (1) learning within an ATM through the local AEPS and (2) learning amongst ATMs through the network-wide AEPS.

Figure 5:
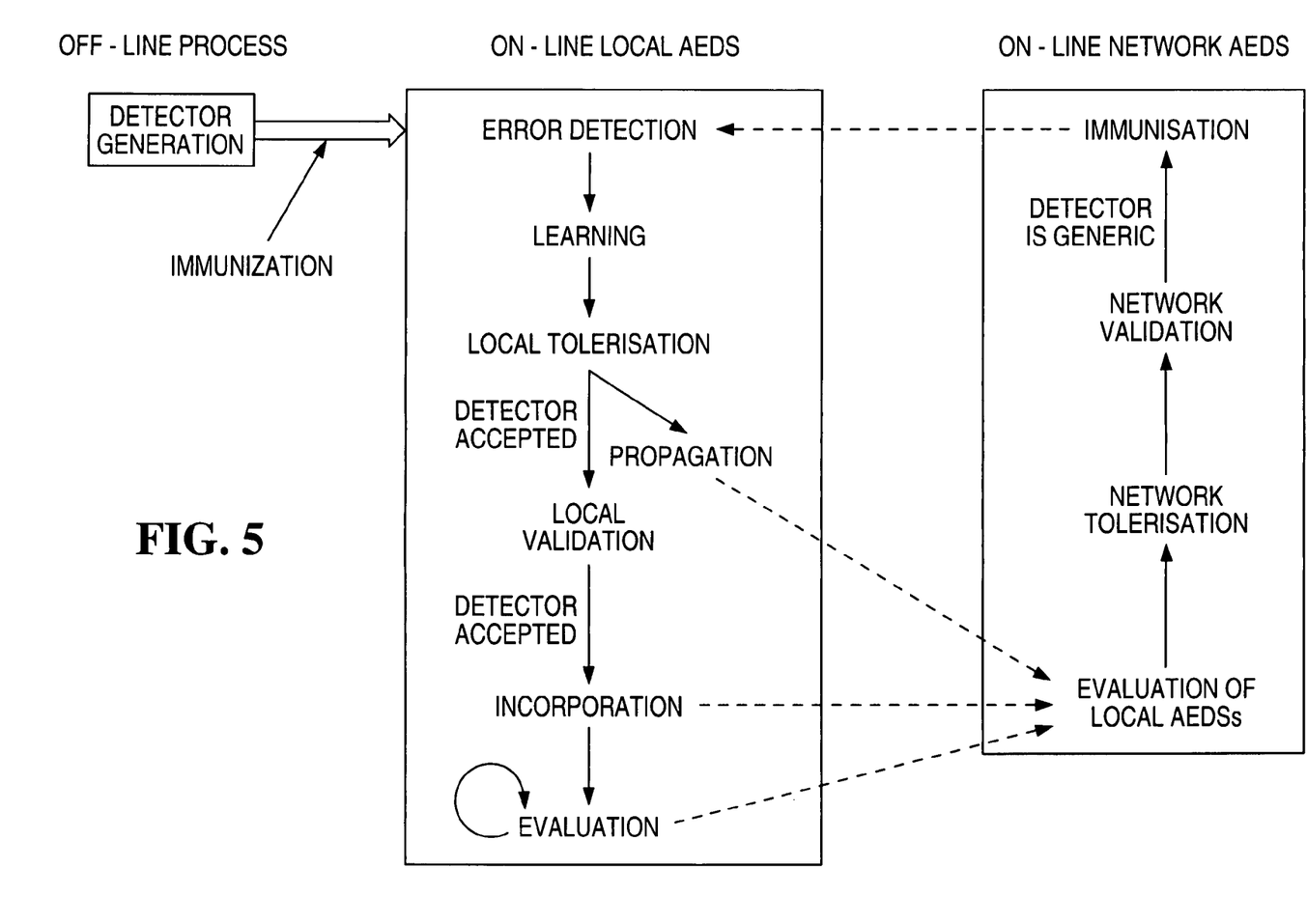
FIG. 5 is an overview of a system in accordance with the present invention.

The design-time immunization phase caters for the distribution of generic detectors amongst ATMs, from an off-line process of detector generation. In contrast, the run-time adaptation phase confers on each ATM a more specialized set of detectors and is responsible for augmenting the generic detectors. The detectors in this case, are pattern recognizers that are endowed with the capabilities for detecting patterns in the ATM device data. An ATM in the network would initially be provided with a set of generic detectors, hence the term immunization. The generic detectors are then augmented with new information in the run-time adaptation phase, such that an ATM is conferred with the ability to learn new patterns. This is based on the definition of learning, which is defined as the augmentation of existing information with novel information. An overview of the system is illustrated in FIG. 5.

The off-line process for generating detectors can use historical data based on patterns detected in a current ATM where historical log data (Table 1) is available. They can also be generated during the development of a new ATM. This allows design engineers to optimize the detectors that are used to seed the ATM during the design process. This optimization is based on the engineers experience and knowledge of the modules and the state transitions that can generate error conditions. It allows them to remove or tune the detectors generated to provide the optimum set of detectors. The detector generation process can be simply described as learning from the past trends in the system to make inferences on when future states of the system may lead to a fatal state. The outcome of this process is a set of generic detectors that are capable of detecting fatal errors common to two or more models of ATM. Immunization is the process of injecting into the local AEPS of the ATM the detectors that were generated off-line and is aimed at distributing generic detectors to all the local AEPSs in the ATMs.

In the on-line local AEPS process the first part is the error detection, where the detectors monitor error behavior in an ATM. The state information generated by the real-time behaviors of the ATM is passed to the local AEPS for classification. This process is performed by classifying incoming states from the device data into states that will induce a fatal state and those that will not. The process of classifying the states is based on a comparison of sequences of incoming states with the existing detectors for a match. This may give rise to situations when the current state in the sequence of incoming states results in no matching detectors. This can then be classified as a novel sequence. Alternatively, the current state may give rise to a new sequence with a matching detector. In addition, there may be cases when multiple detectors match a behavior, in which case confidence values are associated with the detectors. These confidence values influence the decision for selecting detectors such that the detector with the highest value is selected. Adaptation of these confidence values can be performed with regard to correct or incorrect inferences by the associated detectors. This implies that a detector that provides correct inferences from classifying a sequence is rewarded, but penalized for incorrect inferences.

The classification of the ATMs error behaviors may induce appropriate actions if the behaviors are inferred to be precursors to a fatal state. These actions are determined by the expected time that the fatal event will occur. Therefore, actions are initiated when the time interval between the detection of error behavior and expected time of occurrence of the fatal event lies between a defined significant time interval (e.g. minimum of an hour). Thus, the defined time interval signifies the minimum time within which an alert can be triggered. Alternatively, a fail-safe method could be applied shutting down the system to prevent damage. The minimum information contained in the alert should be the inferred fatal state of the ATM as well as expected time of occurrence, which is evaluated for authenticity. This evaluation of the alerts could be through the application of information from system maintenance status or by human experts.

There may be instances when the detectors observe behavior in the device data that cannot be classified as leading to fatal or non-fatal state. This spawns the learning process from FIG. 5. These novel behaviors may be rare events that must be incorporated into the local AEPS. In these situations, the local AEPS learns the new error behavior with a view to generating representative detectors. In one implementation of the framework, where the detectors are represented as rules, the learning process is achieved through continuous rule mining. This is an on-line rule generation algorithm that can be applied to generating new rules representing novel patterns. Depending on the representation of the detectors other algorithms could be applied to generate the representation of the novel patterns. The outcome of the learning process is a set of new detectors, called immature detectors that are initially subject to local polarization and then local validation before being incorporated into the local AEPS.

These immature detectors are first subjected to local polarization, which occurs within the local AEPS. The local polarization process takes the representation produced from the learning process and selects immature detectors that are competent enough to be incorporated into the local AEPS. It is based on the criterion of proving competency at correctly classifying patterns. This is performed by evaluating if a new detector correctly classifies a pattern as leading to a fatal or nonfatal state thereby leading to its incorporation into the local AEPS, otherwise it is discarded. This process occurs within a stipulated period (lifespan) within which the immature detector is expected to prove its competency. At this stage in the processing of the detectors a copy of the new tolerized detector is propagated to the network-wide AEPS.

If an immature detector survives local polarization then it is locally validated to confirm its meaningfulness. This is achieved by taking the immature detectors that detect erroneous behavior and validating them to ascertain the accuracy of the detection. This is carried out by a human-expert in the related domain either a field engineer or the detectors could be validated by a subject matter expert for a specific ATM module. This is used as a method of providing feedback on novel error states to NCR engineering from ATMs in the field. The validation could also be carried out within the local AEPS using automated methods that can be applied to validate the detectors. This allows the testing of the new detector against existing detectors to detect conflicts or contradictions. The automated system can also validate the new detector against a set of known healthy states stored in the local AEPS to ensure that the new detector does not misclassify these as error states. Due to the complexity of including a human in the real-time processing of the new detectors, the best solution may be an automated validation process carried out in the local AEPS based on stored domain-knowledge and a set of business rules. The new detectors can also be validated off-line by either an NCR field engineer, WCS or NCR Engineering as an additional means of filtering invalid detectors.

Once the competent detectors have survived local polarization and local validation they are incorporated into the local AEPS. Here they are added to groups of similar detectors, where similarity is based on defined criteria. The flow of the detectors is illustrated in FIG. 5. The incorporation of the new detectors into relevant groupings is through the application of algorithms inspired by the maintenance of immune system memory. An example of this is to apply a nature-inspired learning algorithm—Self-Stabilizing Artificial Immune Systems (SSAIS), or meta-stable memory algorithm for incorporating the new detectors. These algorithms are AISs that is able to maintain populated regions of the detectors as clusters. Subsequently, a copy of the new detector is also propagated to the network-wide AEPS.

Within a local AEPS the process is evaluated by calculating statistical data such as classification accuracy, population of generic detectors, population of specialized detectors, proportion of classification accuracy accounted for by population of generic detectors versus specialized detectors, and true positive versus false positive detection ratio. These calculated values are also propagated to the network-wide AEPS for global evaluation of local AEPSs. This is a background process to provide information on the detection performance of the detectors in the local AEPS.

As was previously mentioned, throughout the processing in the local AEPS copies of the detectors are propagated to the network-wide AEPS (FIG. 6). These new detectors from the local AEPS become immature-network detectors in the network-wide AEPS. They then undergo four processing stages within the network-wide AEPS: 1\ evaluating the local AEPS input; 2\ network polarization of the new detectors, 3\ network validation of the new detectors and 4\ network immunization by the new competent network detectors.

The evaluation of the local AEPS in the on-line network process forms part of the criteria for evaluating detectors in both the local and network-wide AEPS. Alerts triggered by the new detectors (immature detectors) in the local AEPS systems are forwarded to the network-wide AED for evaluation of their authenticity. Immature-network detectors, in the network AEPS are also evaluated for their authenticity within this process. The evaluation in the network-wide AEPS is carried out in a similar manner to the error detection in the local AEPS but with a network perspective. This allows the comparison between inputs from the different local AEPSs as well as evaluating the inputs from each local AEPS. The evaluation process results in the rewarding or penalization of the detectors in local AEPSs that triggered the alerts. Detectors in local AEPSs that have initiated an alert based on the classification of a state as fatal are rewarded for correct alerts, while incorrect alerts are penalized.

The network polarization of immature-network detectors in the network-wide AEPS occurs within a specified period during which immature-network detectors have to display their competency at the network level. The process of network polarization for each immature-network detector involves a count of local AEPSs that have propagated similar immature-network detectors. Furthermore, the copy of the immature-network detector in a local AEPS is expected to have correctly classified error patterns in the local AEPS. These two criteria jointly measured above a specified threshold result in the immature-network detector being promoted to a competent network detector.

The network validation is similar to the local validation since they both involve feedback from an expert, but in this case feedback is provided on the immature-network detectors that have survived network polarization. The feedback determines whether such immature-network detectors will be promoted to competent-network detectors or not. The outcome is that immature-network detectors that have successfully undergone network polarization and network validation become competent-network detectors.

The competent-network detectors generated are applied to immunize the local AEPSs. The process only applies to the local AEPSs that do not currently have a copy of the competent-network detectors. These will be the ATMs that have until that point not detected the pattern of state transitions that can lead to the fatal state in the ATM. The immunization process extracts generic detectors from the pool of new detectors for distribution to all local AEPSs in the network. It serves as a means of updating the generic detectors in all the local AEPSs.

The processing stages that apply to the device level ATM data and were described previously require a communication mechanism within the ATM network to allow the communication of the detectors generated in the local AEPS to be passed to the network-wide AEPS and the network-wide AEPS to immunize the various local AEPSs in the ATM network. This communication can be supported by the management infrastructure currently used for the management of ATM networks. Again, the framework used to implement the network based AIS system does not require any changes to the current architecture and can be used in parallel with the existing management systems. An overview of the architecture is shown in FIG. 6.

Each ATM on the network contains a local AEPS implemented as a software AIS agent. This contains the intelligence and predictive functionality described previously. The AIS monitors the behavior of the ATM through error state information, known in the field as the M-Status and M-Data, which is reported from each device. This data is already processed in the application since it is used to generate an error log, known in the field as a devlog file, so the implementation of the AIS only requires the data to be passed to it as well. Other sources of data from other standard log files that are written during a transaction can also be used to augment the device data. The AIS agent contains the local copies of the detectors and the immature detectors that are undergoing polarization. When the agent detects an error condition the alert that is generated will be sent through the existing management interface. This could be the Simple Network Management Protocol (SNMP) interface connected to a NCR Gasper™ management system. In other cases the alert would be wrapped in the existing management protocol and sent to the management centre in a similar manner as any other alert.

The central ATM management system contains the network-wide AEPS, again implemented as an AIS as described above. This can co-exist with the existing management and dispatch system used by the financial institution. It can use the ATM network SNMP manager to receive and send query messages to the AIS agents in the ATMs in the network.

The AIS network monitors the performance of the immature network detectors in its polarization area. When these have been tolerized they are then propagated through the network to all ATMs. These can be applied to all the ATMs of a specific model, in similar usage patterns or to all ATMs on the network. The information can also be sent to an engineer to be applied to either new ATMs or to be propagated to other network-wide AEPSs. In this way the learning from one system can be used across all AIS enabled systems and can be included in the generic detectors that are used to seed new ATMs. The propagation of the new detectors would also be through the existing management system again using SNMP if this was available. This allows the AIS to be integrated with an existing ATM network without requiring additional infrastructure to be implemented.

The architecture also addresses the current problem of "false positives" that can be generated from the state information. When the local AEPS creates a warning based on a prediction of a potential fatal state, this will then be processed by the network AEPS prior to being passed onto the network management software. This allows these alarms to be filtered and the predictions of the local AEPS to be tuned by the network AEPS through the application of intelligence that has been gathered from all the local AEPSs on the network.

There is also a method implemented in the systems to allow the selection of detectors where more than one detector matches the same pattern. This is optimized through the local AEPS evaluation process in the network AEPS which would compare the different detectors and their efficiency in the different local AEPSs. This provides the advantage of a network-wide view of the detectors rather than trying to limit the evaluation to a specific ATM. This allows the different confidence values to be applied to the different detectors and compared both within a local AEPS and across AEPSs.

The network AEPS can also be used to tune the local AEPSs in the timing of predicted fatal states. This will again take input from a number of local AEPSs to intelligently process the timing of the predictions of an ATM entering a fatal state. This will be very important to allow timely preventative maintenance on ATMs that are predicted to fail. The exact prediction of the time to failure will allow the scheduling of the service call to avoid unnecessary dispatches of field engineers to the ATM. This timing information will be built into the system as well as the prediction based on the next state to predict when the state will change. Modifications may be incorporated without departing from the scope of the present invention.

What is claimed is:

1. A computer program embodied in a computer-readable medium for predicting the probable future status of one or more components within an Automated Teller Machine, ATM, the components including
   (A) a pick mechanism which withdraws currency sheets from a storage cassette and which is driven by a first electric motor (70),
   (B) a transport mechanism which receives currency sheets from the pick mechanism and which is driven by a second electric motor (71), and
   (C) a purge bin (108) which receives currency sheets which have been withdrawn from a storage cassette but not delivered to a customer,
and the ATM comprising
   (1) a plurality of sensors arranged to monitor the operation of components of the ATM, said sensors including
      (A) a sensor which detects speed of said first motor (70),
      (B) a sensor which detects speed of said second motor (71),
      (C) a sensor which ascertains whether currency sheets are present in the purge bin (108),
      (D) one or more temperature sensors which measure temperature at different locations within the ATM, and
      (E) one or more humidity sensors which measure humidity at different locations within the ATM, and
   (2) a control means arranged to receive information from said plurality of sensors,
the program being adapted to:
   a) receive said sensor information;
   b) analyze said information to ascertain sensor patterns from said sensor information;

c) compare said sensor patterns with detectors, which are predefined patterns, indicative of the future condition of said one or more components within the ATM; and d) classify said sensor patterns as being
   i) presently indicative of future failure of a component, if a detector so indicates, and
   ii) a novel pattern, if no corresponding detector is found.

2. A program as claimed in claim 1, in which newly created detectors are installed in ATMs and a newly created detector is used more frequently if it proves to be successful in correctly predicting the failure of a component within the ATM.

* * * * *